United States Patent [19]

Woodger

[11] 4,204,804
[45] May 27, 1980

[54] TURBOSET SUPPORT

[75] Inventor: Andrew Woodger, Avondale, New Zealand

[73] Assignee: BBC Brown, Boveri & Company, Limited, Baden, Switzerland

[21] Appl. No.: 877,656

[22] Filed: Feb. 14, 1978

[30] Foreign Application Priority Data

Mar. 21, 1977 [CH] Switzerland ............... 3483/77

[51] Int. Cl.² ..................... F01D 25/28
[52] U.S. Cl. ............... 415/219 R; 60/644; 60/682
[58] Field of Search ............ 60/644, 650, 682; 176/60; 415/219 R

[56] References Cited

U.S. PATENT DOCUMENTS

| | | | |
|---|---|---|---|
| 3,623,325 | 11/1971 | Jubb et al. | 60/644 |
| 3,740,168 | 6/1973 | Hug et al. | 415/219 R |
| 3,742,707 | 7/1973 | Andrews et al. | 176/60 X |
| 4,050,660 | 9/1977 | Eggman et al. | 415/219 R |
| 4,120,750 | 10/1978 | Forster et al. | 60/644 |

Primary Examiner—Allen M. Ostrager
Attorney, Agent, or Firm—Oblon, Fisher, Spivak, McClelland & Maier

[57] ABSTRACT

Propping devices are provided between a foundation and a turboset which are adjustable in height and movable in an axial direction, and which penetrate in a gastight manner a pressure vessel in which the turboset is disposed. The propping devices also have locating features for absorbing vertical and tangential movements independently of deformations of the pressure vessel.

8 Claims, 3 Drawing Figures

TURBOSET SUPPORT

BACKGROUND OF THE INVENTION

The present invention relates to a propping device of a turboset, particularly a high-temperature helium turbine comprising of a compressor and a generator coupled thereto, the turboset being arranged in a prestressed pressure vessel, preferably a prestressed concrete pressure vessel, and the pressure vessel being supported on a foundation.

In power station systems now in use, more particularly in systems using high-temperature helium turbomachines, the reactor core, the heat exchangers and, therebelow, one or more turbines, are housed in horizontal galleries. The turbines may be installed in various ways, e.g. in star formation, axially parallel to one another, or one behind the other. In all of these arrangements the components of the main circuit are housed in a prestressed concrete containment.

In these prior art systems, the turbomachines, mounted on special trolleys for assembling and dismantling, are pushed into the prestressed-concrete gallery. These trolleys run on rails mounted on the liner of the lower part of the gallery. By way of example, the turbomachine is so arranged that the gas inlet to the compressor is close to the reactor outlet. When the turbine has been installed, the gallery is sealed off by a pressure-resistant concrete plug. The turbine housing, consisting of an upper and a lower half, is supported coaxially within the gallery in multiple planes.

This results in a number of drawbacks which are caused in part by the fact that, due to the prestressing on the circumference and to the bracing cables arranged in the vertical direction, the prestressed concrete pressure vessel is deformed elastically and plastically, with the result that in the majority of cases the axis of the gallery is subject to sagging. The turbomachine itself can only be aligned after the prestressing of the concrete vessel has taken place. The deformations of the prestressed concrete vessel occurring throughout the operation and caused by operating influences, such as pressure and temperature of the working circuit, are difficult to evaluate beforehand. However, these deformations return to the original state when the machine has been shut down, that is to say, after removal of the pressure and temperature effects. However, after a fairly long operation period, there appears an extra permanent deformation caused by the relaxation of the prestressed concrete vessel, the extent of which cannot be accurately predicted.

Another drawback is that the gallery cannot be placed in the neutral zone of the substantially vertically mounted prestressed concrete vessel which houses the reactor. In this case, one would not have to fear a deformation of the horizontal axis of the gallery. However, since this space is occupied by the integrated reactor core, such an arrangement cannot be realized. By disposing the gallery below the reactor cavern in the lower half of the prestressed concrete vessel, i.e., in a horizontal direction and perpendicular to the longitudinal axis of the vessel, a peripheral position of the gallery is obtained in the lower half of the prestressed concrete vessel, so that a deflection of the gallery axis must be reckoned with. Now, when the turbomachine is supported directly in the gallery, it sags together with the gallery in service. In addition, the longitudinal axis of the generator can be displaced in relation to the position of the turbomachine shaft owing to the deformation of the prestressed concrete vessel. These motions cause a deformation both in the turbomachine casing and in the whole power assembly shaft, resulting in an extra load onto the shaft bearing.

SUMMARY OF THE INVENTION

Accordingly, it is an object of the present invention to provide a support which does not have the drawbacks above referred to, wherein the turbomachine machine and the generator can be protected from any type of deformations, and wherein the turboset can be mounted simply by using remote manipulation means.

This and other objects of the invention are achieved by providing, between the foundation and the turboset, propping devices which are adjustable in height and can move in an axial direction, and which penetrate the pressure vessel in a gas-tight manner and have locating features for absorbing vertical and tangential displacements independently of deformations of the pressure vessel.

Another advantage is the provision of lugs alongside the turboset which act on the propping devices.

The advantage of the arrangement according to the invention is seen in the fact that the turboset and the prestressed concrete vessel are supported on the foundation independently of one another, whereby deformations occurring in the prestressed concrete vessel are not transferred to the turboset, since the latter can be aligned by the propping devices which are adjustable in height and can move in axial direction independently of the axial position of the pressure vessel.

A particular advantage is the construction of the propping devices in such a manner that their heights are adjustable by hydraulic, mechanical or mechanical-hydraulic means.

A further advantage is the arrangement of seals between the pressure vessel and the propping devices.

This arrangement of seals ensures that no radioactively contaminated helium can leak out of the interior of the pressure vessel in which the turboset is located; at the same time, penetration of air into the helium atmosphere inside the pressure vessel is prevented.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
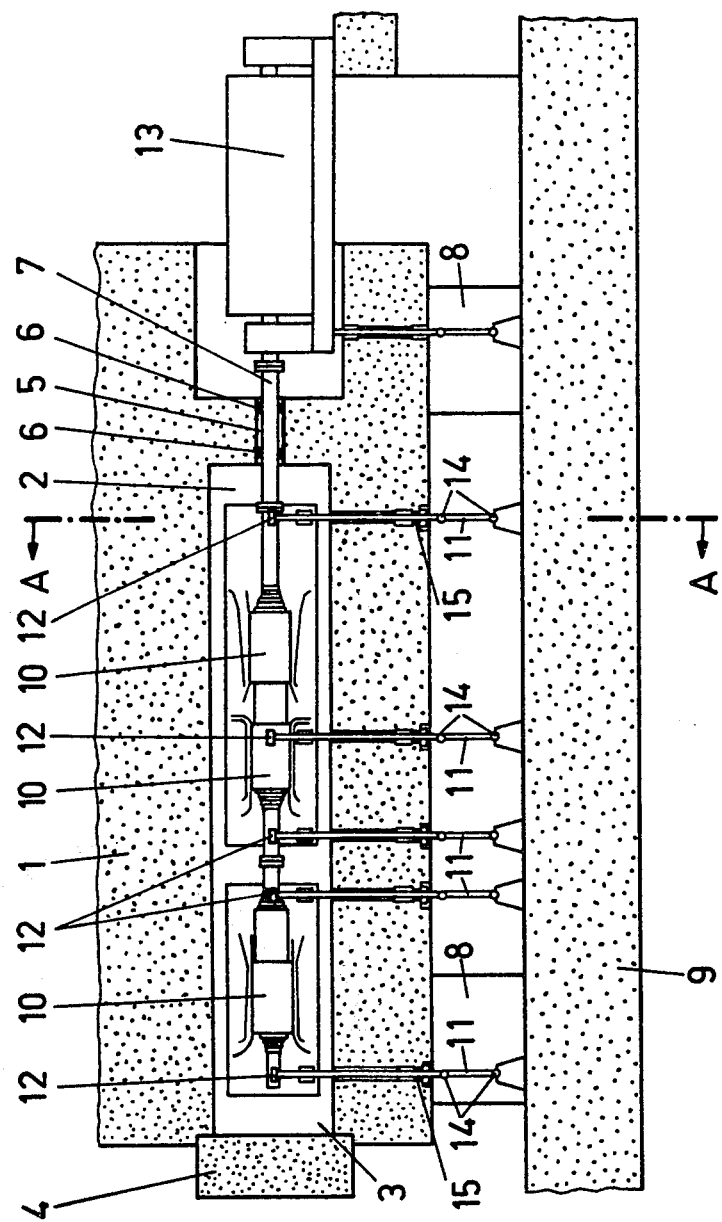
FIG. 1 is a longitudinal section of a turbine arrangement according to the invention in a pressure vessel.

Referring now to the drawings, wherein like reference numerals designate identical or corresponding parts through the several views, and more particularly to FIG. 1 thereof, there is illustrated a pressure vessel 1, preferably a prestressed concrete pressure vessel, in which a gallery 2 is located and at one end of which the gallery 2 has a slide-in opening 3 that can be sealed hermetically by a concrete cover 4. At the opposite to the slide-in opening 3 there is provided a penetration 5 with seals 6 for shaft 7. The pressure vessel 1 is supported on a foundation 9 by means of supports 8. The supports 8 are designed in such a manner that, between pressure vessel 1 and the surfaces of the supports, there is deposited a slip layer (not shown) which permits relative motions between the pressure vessel and the support 8. The horizontal fixed point of the pressure vessel 1 is in the vertical axis thereof and is not shown in FIG. 1. In gallery 2 is mounted the turboset 10 consisting of at least one each compressor/turbine stage, on props 11, on which lugs 12 are supported alongside the turboset 10. The turboset 10 is connected with a generator 13 via the shaft 7, the generator 13 being arranged either partly in the pressure vessel or completely outside of it.

The propping devices 11 are fixed on the foundation 9 and are designed in such a manner that their heights are adjustable in vertical direction, that is to say, they can be adjusted to the proper height in a known manner either by hydraulic, mechanical or by mechanical-hydraulic means. The relative displacement between the pressure vessel 1 and the turboset 10 causes a sliding of the lugs 12 in the sockets 16 (FIG. 3) of the propping devices 11. Seals 15, e.g., stuffing boxes or bellows joints, are disposed between the props 11 and the pressure vessel 1.

Figure 2:
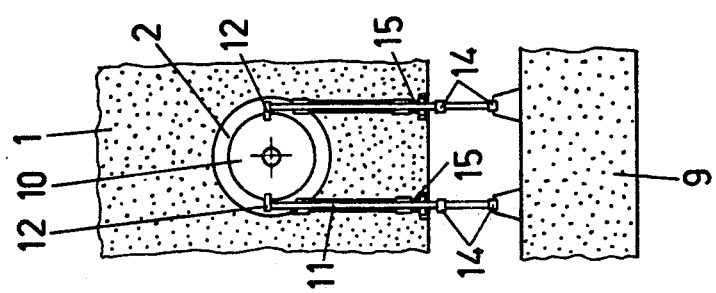
FIG. 2 is a sectional view of the arrangement of FIG. 1.

In FIG. 2, which illustrates a cross-section of the pressure vessel along the line A—A in FIG. 1, like reference numerals denote like parts, as in FIG. 1.

Figure 3:
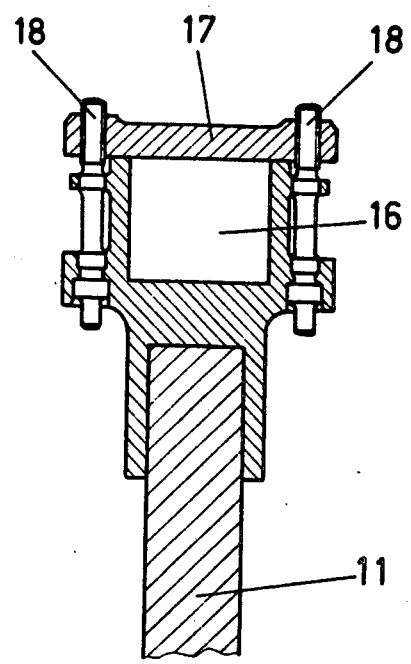
FIG. 3 is a detail drawing of an upper section of a propping device with a locating feature.

The upper portion of the prop shown in FIG. 3 has a socket 16 for the lugs 12, as well as a locating feature 17 which is attached by means of the screws 18 to the upper portion of the prop 11. Preferably, the locating feature 17 is so designed that it can be laid over the lugs 12 by applying remote manipulation means and the screws 18 can likewise be tightened by said means.

The propping means according to the invention functions as follows: The turboset 10 is pushed through the opened slide-in opening 13 into the gallery 2, preferably on rails (not shown) until it reaches its final position. The turboset 10 is then lifted until it reaches the position in which the shafts are lined-up correctly, then the lugs 12 are moved out and the props 11 are raised until the lugs 12 engage the socket 16. Then, the locating features 17 are placed over the lugs 12 by remote handling and connected with the props 11 by means of the screws 18. After the concrete cover 4 has been closed, the gallery 2 is sealed hermetically.

Since the props 11 are fixed on the foundation 9 and are individually in vertical direction and, furthermore, since each of the props 11 has two joints 14, the horizontal relative displacement between the pressure vessel 1 and the foundation 9 can be compensated. Any deformation of the foundation 9 can also be compensated by readjusting the props 11 during inspection of the turboset. The changes in length of the props 11 are dependent on the load, the pressure in the gallery and the temperature of the props 11. Since these are known physical quantities, they can already be taken into account when dimensioning the props 11. The design of the props 11 permits uniform changes in length at all points of support. Varying loads on the props 11 by the torque do not affect the position of the turboset shaft.

The turboset prop according to the invention permits, with little technical complexity, easy adjustment of the accurate position of the turboset shaft in the pressure vessel 1. The turboset 10 can at all times be protected from any deformations of the pressure vessel 1. Since the turboset 10 and the generator 13 share a common base of support, saggings of the shaft due to relative motions of the foundations are prevented. Since the turboset 10 is held in horizontal position by means of the props 11, there is no need for a special suspension or a supporting device in the gallery 2. In view of the design of the foundation 9, the invention offers the simple possibility of supporting the turboset 10 in multiple planes.

Obviously, numerous modifications and variations of the present invention are possible in view of the above teachings. It is therefore to be understood that within the scope of the appended claims, the invention may be practiced otherwise than as specifically described herein.

What is claimed as new and desired to be secured by Letters Patent of the United States is:

1. A turbine arrangement comprising:
   a foundation;
   a prestressed pressure vessel supported on the foundation;
   a turboset located in the pressure vessel; and
   means resting on the foundation and penetrating the pressure vessel in a gas-tight manner for propping the turboset, the propping means being adjustable in height and movable in an axial direction and having locating features for absorbing vertical and tengential motions independently of deformations of the pressure vessel.

2. The turbine arrangement recited in claim 1 including:
   lugs acting on the propping means and arranged alongside the turboset.

3. The turbine arrangement recited in claim 1 wherein the height of the propping means is adjustable by hydraulic means.

4. The turbine arrangement recited in claim 1 wherein the height of the propping means is adjustable by mechanical means.

5. The turbine arrangement recited in claim 1 wherein the height of the propping means is adjustable by mechanical-hydraulic means.

6. The turbine arrangement recited in claim 1 including:
   seals disposed between the pressure vessel and the propping means.

7. The turbine arrangement recited in claim 1 wherein the vessel is a prestressed concrete pressure vessel.

8. The turbine arrangement recited in claim 1 wherein the turboset is a high-temperature helium turbine having a compressor and a generator.

* * * * *